United States Patent [19]

Habiger

[11] 4,019,602

[45] Apr. 26, 1977

[54] SEAT ACTUATED FLUID DRIVE NEUTRALIZING ARRANGEMENT

[75] Inventor: Cyril W. Habiger, Joliet, Ill.

[73] Assignee: Caterpillar Tractor Co., Peoria, Ill.

[22] Filed: June 7, 1976

[21] Appl. No.: 693,392

[52] U.S. Cl. .............................. 180/101; 180/82 A
[51] Int. Cl.² ......................................... B60K 28/00
[58] Field of Search ............... 180/82 A, 101, 66 R; 60/52, 445

[56] References Cited

UNITED STATES PATENTS

| | | | |
|---|---|---|---|
| 2,931,454 | 4/1960 | Schuster | 180/101 |
| 3,265,150 | 8/1966 | Westman | 180/101 |
| 3,332,522 | 7/1967 | Dence | 188/109 |
| 3,334,488 | 8/1967 | Lauck | 180/101 X |
| 3,360,305 | 12/1967 | Ryskamp | 180/101 X |
| 3,376,703 | 4/1968 | Buczynski | 180/101 X |
| 3,507,350 | 4/1970 | Boyajian | 180/101 |
| 3,700,062 | 10/1972 | Garnett | 180/101 |

Primary Examiner—Joseph F. Peters, Jr.
Assistant Examiner—Terrance L. Siemens
Attorney, Agent, or Firm—John W. Grant

[57] ABSTRACT

A fluid drive arrangement of a vehicle is shiftable to forward and reverse drive conditions when actuating fluid from an auxiliary source of pressurized fluid is directed to a hydraulic actuator device of the fluid drive arrangement and is shifted to a neutral position automatically when the flow of actuating fluid to the hydraulic actuator device is blocked. A solenoid operated valve device is disposed between the auxiliary source of fluid and the hydraulic actuator device and has an energized fluid supplying position for directing actuating fluid to the hydraulic actuator device and a de-energized fluid blocking position for blocking pressurized fluid from the hydraulic actuator device. An electrical switch is disposed within a conductor line connecting a source of electrical energy to the solenoid operated valve device and has a closed position for completing an electrical circuit to energize the solenoid operated valve device and an open position for de-energizing the solenoid operated valve device. The electrical switch is disposed beneath an operator's seat of the vehicle in a position to be engaged by the seat and actuated to its closed position when the seat is moved to its lowered occupied position and is actuated to its open position when the seat is moved to its raised unoccupied position.

7 Claims, 2 Drawing Figures

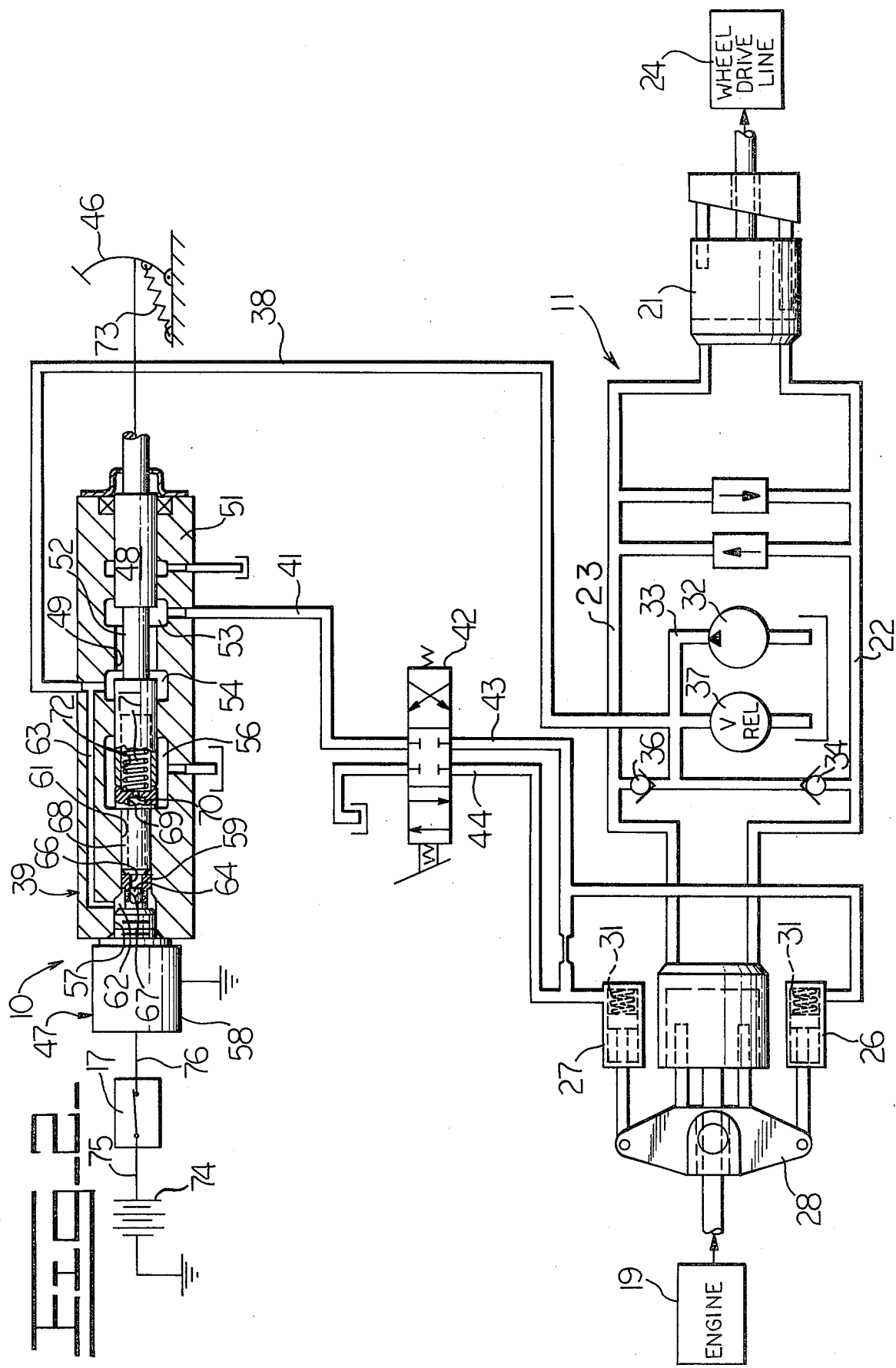

SEAT ACTUATED FLUID DRIVE NEUTRALIZING ARRANGEMENT

BACKGROUND OF THE INVENTION

This invention relates to a device for preventing movement of a vehicle under its own power when the seat is unoccupied and more paricularly to a device for automatically neutralizing a hydraulic drive arrangement when the driver gets off of the operator's seat.

The so called "dead man" controls have been employed for many years on all types of vehicles to stop the vehicle automatically if the operator gets off the seat. Such dead man controls include both mechanical and hydraulic apparatuses for applying vehicle brakes and both types of apparatuses have also been employed for disengaging a clutch in the drive line or transmission. However, heretofore such dead man controls have not been available for vehicles having a fluid drive train in which tractive power is transmitted to the wheels through a fluid drive motor which in turn is driven by pressurized fluid delivered from a fluid pump driven by the engine.

OBJECT OF THE INVENTION

Accordingly, it is an object of this invention to provide an improved seat actuated fluid drive neutralizing arrangement for neutralizing the transmission of power to the wheels of the vehicle when the seat is unoccupied.

Another object of this invention is to provide such an improved seat actuated fluid drive neutralizing arrangement which automatically neutralizes a fluid drive arrangement having a fluid motor driven by pressurized fluid delivered thereto from a fluid pump.

Another object of this invention is to provide an improved seat acutated fluid drive neutralizing arrangement of the character described which eliminates the routing of fluid lines under the seat from the transmission.

Other objects and advantages of the present invention will become more readily apparent upon reference to the accompanying drawings and following description.

BRIEF DESCRIPTION OF THE DRAWINGS

FIG. 2 shows a schematic view of the present invention with certain components shown in section for illustrative convenience.

DESCRIPTION OF THE PREFERRED EMBODIMENT

Figure 1:
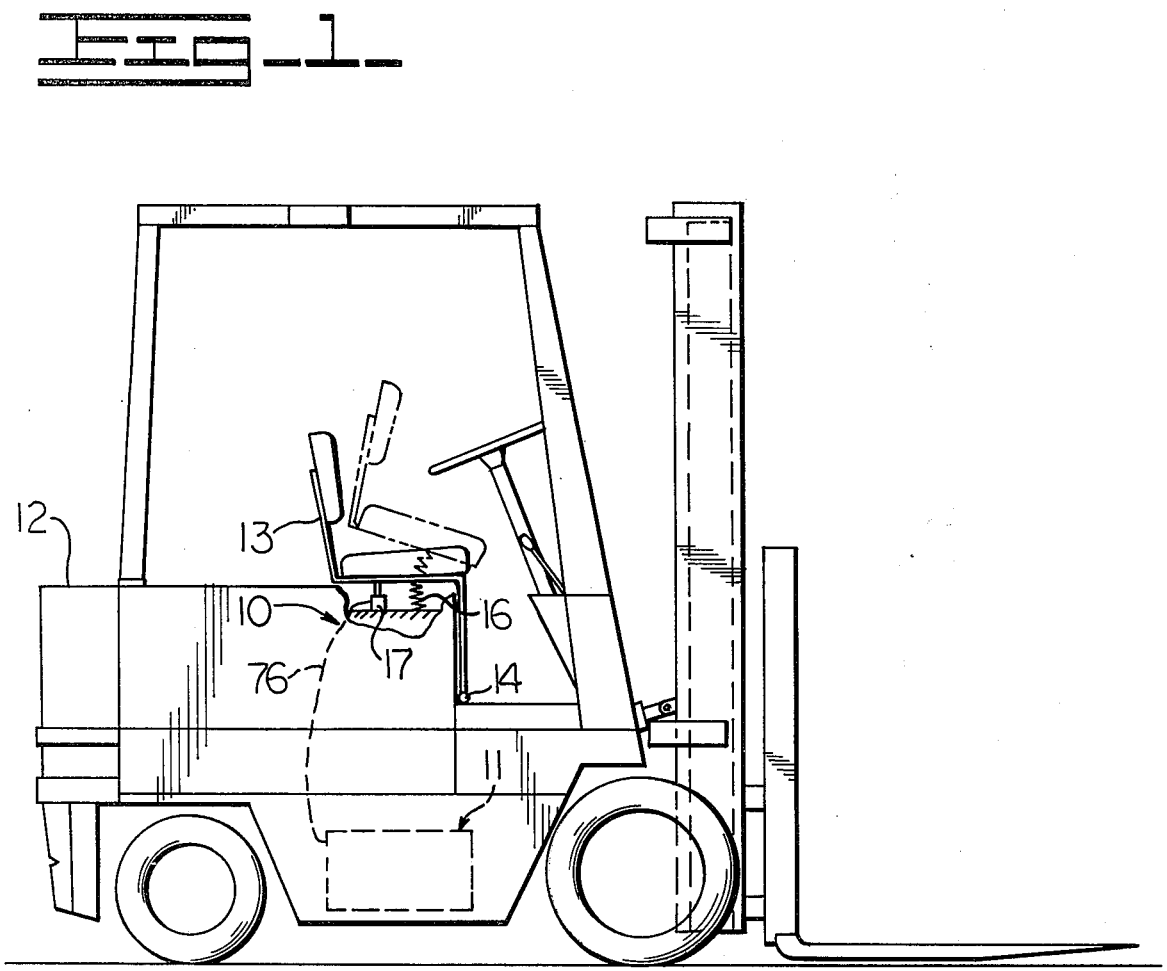
FIG. 1 is a side elevational view of the fork lift truck on which the seat seat actuated drive neutralizing arrangement embodying the principles of the present invention is employed.

Referring now to the drawings, a seat actuated fluid drive neutralizing arrangement is generally indicated by the reference numeral 10 in association with a fluid drive arrangement 11 of a vehicle 12. The vehicle includes an operator's seat 13 hingedly connected at a pivot 14 for movement between a lowered occupied position shown by solid lines and a raised unoccupied position as shown by dashed lines. A spring 16 is disposed beneath the seat for resiliently biasing the seat to the raised unoccupied position when the operator gets off the seat. An electrical switch 17 is also disposed beneath the seat for engagement therewith so that the switch is closed when the seat is moved to the lowered occupied position and is automatically opened by internal springs, not shown, when the seat is moved to the raised unoccupied position.

The fluid drive arrangement 11 includes an overcenter variable displacement fluid pump 18 driven by an engine 19. The fluid pump is in fluid communication with a fluid motor 21 through a pair of conduits 22 and 23 which make up a closed loop fluid circuit between the pump and motor. The drive motor is drivingly connected to a wheel drive line 24 which drives a pair of the wheels of the vehicle in the usual manner. The output of the pump is controlled by a pair of hydraulic actuators 26 and 27 operatively attached to a pivotal swash plate 28 of the pump. Directing fluid to the hydraulic actuator 26 causes the actuator to shift in the swash plate causing the pump to drive the motor in a forward direction. Conversely, directing fluid to the hydraulic actuator 27 causes the swash plate to shift in the opposite direction and establish reverse drive through the drive motor. Each of the hydraulic actuators has a spring 31 disposed therein to resiliently return the swash plate to the neutral position shown in the absence of hydraulic fluid to either of the fluid actuators to establish a neutral condition of the fluid drive arrangement.

The fluid drive arrangement has a auxiliary make up pump 32 connected to both conduits 22 and 23 through a line 33 and a pair of check valves 34 and 36. A relief valve 37 is connected between the line and a fluid supply tank to maintain the pressure in the closed loop at a preselected minimum value. The auxiliary pump also supplies pressurized actuating fluid to the hydraulic actuators 26 and 27 through a first pilot line 38 connected to the line 33, a control valve 39 connected to the opposite end of the pilot line and second pilot line 41 connecting the control valve to a manually actuated selector valve 42. The selector valve is in turn connected to the hydraulic actuators through a pair of lines 43 and 44. The selector valve is spring centered to the position shown whereby pressurized actuating fluid from the pump 32 is blocked from the hydraulic actuators establishing the neutral condition of the fluid drive arrangement. When the control valve is in the position shown, as will hereinafter be described in greater detail, the pressurized fluid is available in the second pilot line 41 such that manually shifting the selector valve to the right as viewed in FIG. 2 directs pressurized fluid through the line 43 to the hydraulic actuator 26 for establishing the forward drive condition of the fluid drive arrangement. Similarly, shifting the selector valve to the left directs fluid through line 44 to the hydraulic actuator 27 to establish the reverse drive condition of the fluid drive arrangement.

The control valve 39 is a dual purpose solenoid operated valve device and is actuated to a fluid blocking position to block fluid flow between pilot lines 38 and 41 either manually through a pedal 46 operatively attached to one end thereof or by pressurized pilot fluid from the makeup pump 32. The flow of pilot fluid is controlled by a solenoid operated valve 47 operatively attached to the other end of the control valve. Blocking fluid flow through the control valve and thus line 41 causes the fluid drive arrangement 11 to be shifted to the neutral condition regardless of the position of the selector valve 42. The control valve includes a valve spool 48 which is reciprocably disposed within a bore 49 of a valve body 51 and has a reduced diameter portion 52 formed thereon intermediate its ends. A plurality of axially spaced annuluses 53, 54, and 56 are formed in the valve body with annuluses 53 and 54 being connected to the pilot lines 41 and 38, respectively. With the valve spool in the leftward position shown, the reduced diameter portion communicates the annulus 54 with annulus 53 permitting fluid flow therebetween. Shifting the valve spool to the right blocks fluid flow between the annuluses 54 and 53.

The solenoid operated valve 47 is screw threaded into a threaded bore 57 at the other end of the body and includes a solenoid 58. A tubular stem 59 sealingly extends into a bore 61 which is formed in the valve body concentric with the bore 49 and opens into the annulus 56. The stem forms a fluid chamber 62 in the valve body, the fluid chamber being connected to the first pilot line 38 through a passage 63. A valve element 64 of the solenoid valve slidably extends into a bore 66 formed in the stem to control communication through a pair of radially extending inlet ports 67 connecting the fluid chamber with the bore 66. The valve element of the solenoid valve is resiliently biased by internal spring means, not shown, to the open position to allow flow of fluid through the inlet ports. Energizing the solenoid causes the plunger to extend to the position shown to block communication between the fluid chamber and the bore 66 through the inlet ports.

An elongated piston 68 is slidably disposed within the bore 61 between the inwardly protruding end of the stem 59 and the inner end of the valve spool 48. An axially extending passage 69 and an orifice 70 are formed in the piston to provide limited communication between the bore 66 of the stem 59 and the annulus 56. A spring 71 is partially disposed within an axially extending recess 72 formed in the inner end of the valve spool and has one end in abutment with the piston to provide a resilient biasing force urging the valve spool to the right or to the fluid blocking position. A spring 73 is suitably attached to the pedal 46 and has sufficient force to overcome the resiliency of the spring 71 thereby normally urging the valve spool to the open position shown.

The solenoid 58 is connected to an electrical circuit which includes the switch 17 disposed under the operator's seat. A source of electrical energy such as a battery 74 is connected to the switch through a conductor 75 with the switch in turn being connected to the solenoid through a conductor 76.

OPERATION

While the operation of the present invention is believed clearly apparent from the foregoing description, further amplification will subsequently be made in the following brief summary of such operation. The basic operation of the present invention utilizes the operational feature of the fluid drive arrangement 11 wherein the presence of pressurized actuating fluid at one of the hydraulic actuators 26 or 27 is required to shift the fluid drive arrangement to either the forward or reverse drive condition and wherein the fluid drive arrangement is automatically shifted to the neutral position in the absence of pressurized actuating fluid at both of the hydraulic actuators. Such actuating fluid to the hydraulic actuators must first pass through the control valve 39 which is in the open fluid supplying position shown when the operator's seat 13 is in the lowered position such as when an operator is seated thereon. With the seat in the lowered position, the electrical switch 17 is closed completing the electrical circuit to energize the solenoid 58 of the solenoid operated valve 47 causing the valve element 64 to be extended to the position shown blocking fluid through the inlet ports 67. The bias of the spring 73 positions the valve spool 48 in the open fluid supplying position to direct fluid through the line 41. Thus, the selector valve 42 may be manually actuated to control shifting of the fluid drive arrangement to either the forward, neutral or reverse drive condition in the usual manner.

When the control valve 39 is in the position shown, the valve spool 48 may be manually shifted to the right by depressing the pedal 46. Although not essential to the operation of the present invention, the pedal is preferably attached to the valve spool through suitable linkage whereby depressing the pedal relieves the biasing effect of the spring 73 so that the spring 71 resiliently biases the valve spool to the right or fluid blocking position. Thus, as the pedal is depressed, fluid flow to the hydraulic actuators 26 and 27 is progressively blocked to establish the neutral condition of the fluid drive arrangement 11. Thus, the pedal provides a function commonly called creeping or inching.

When the operator gets off the operator's seat 13 the seat is resiliently pivoted to the raised unoccupied position by the spring 16 permitting the electrical switch 17 to open and break the electrical circuit to de-energize the solenoid 58 of the solenoid operated valve 47. This causes the valve element 64 to be resiliently retracted to establish communication through the inlet ports 67 so that pressurized actuating fluid passes from the fluid chamber 62 through the inlet ports and into the bore 66. The inlet ports permit a greater volume of fluid to pass therethrough than is capable of escaping through the orifice 70 thereby generating fluid pressure between the stem 59 and the piston 68. Such pressurized fluid reacts against the piston moving it to the right, which in turn forces the valve spool 48 to the right to the fluid blocking position. As previously stated, blocking the flow of pressurized to the hydraulic actuators permits the hydraulic actuators 26 and 27 to automatically establish a neutral condition of fluid drive arrangement 11.

In view of the foregoing, it is readily apparent that the structure of the present invention provides an improved seat actuated neutralizing arrangement which automatically shifts the fluid drive arrangement of a vehicle to a neutral condition when the operator gets off the operator seat. This is accomplished by utilizing a solenoid operated valve to control shifting of the valve spool between an energized fluid supplying position and a de-energized fluid blocking position for controlling fluid flow to the hydraulic actuators which control the output displacement of the fluid pump. The energizing and de-energizing of the solenoid operated valve is effected through an electrical switch disposed beneath the seat in position to be closed when the seat is in the lowered occupied position and to be opened when the seat is in the raised unoccupied position. This also eliminates the routing of hydraulic lines beneath the seat from the fluid drive arrangement.

While the invention has been described and shown with particular reference to the preferred embodiment, it will be apparent that variations might be possible that would fall with the scope of the present invention, which is not intended to be limited except as defined in the following claims.

What is claimed is:

1. In a vehicle of the type having an operator's seat movable between a raised unoccupied position and a lowered occupied position, an engine, a wheel drive line, and a fluid drive arrangement shiftable to forward, neutral and reverse drive conditions and including an overcenter variable displacement fluid pump driven by the engine and a fluid motor drivingly connected to the drive line, an auxiliary source of pressurized fluid, and hydraulic actuator means operatively connected to the fluid pump for establishing the forward and reverse drive conditions when actuating fluid from the auxiliary source of fluid is directed thereto and for establishing the neutral position when the flow of actuating fluid thereto is blocked, wherein the improvement comprises:

solenoid operated valve means disposed between the auxiliary source of fluid and the hydraulic actuator means and having an energized fluid supplying position for directing actuating fluid from the auxiliary source of fluid to the hydraulic actuator means and a de-energized fluid blocking position for blocking pressurized fluid from the hydraulic actuator means;

a source of electrical energy;

a conductor connecting the source of electrical energy to the solenoid operated valve means; and an electrical switch disposed within the cnductor and having a closed position for completing an electrical circuit to energize the solenoid operated valve means and an open position for de-energizing the solenoid valve, the electrical switch being disposed beneath the operator's seat in a position to be engaged by the seat and actuated to its closed position when the seat is moved to the lowered occupied position and is actuated to its open position when the seat is moved to the raised unoccupied position.

2. The combination of claim 1 including a pedal operatively connected to the solenoid operated valve for manually positioning the valve in its fluid blocking position.

3. The combination of claim 1 wherein the solenoid operated valve means includes a valve spool shiftable to the fluid supplying and fluid blocking positions, and including resilient means operatively associated with the valve spool for resiliently biasing the valve spool to the fluid supplying position when the solenoid operated valve means is energized.

4. The conbination of claim 3 wherein the solenoid operated valve means includes an elongated piston having one end disposed for abutment with the valve spool, passage means communicating the auxiliary source of fluid to the other end of the piston, and a solenoid operated valve for controlling the flow of fluid through the passage means to the piston.

5. The combination of claim 4 wherein the solenoid operated valve includes a solenoid connected to the conductor to be energized when the switch is closed, and a valve element operatively connected to the solenoid for extension into the passage means for blocking fluid flow therethrough when the solenoid is energized and is retracted from the passage means permitting fluid flow therethrough when the solenoid is de-energized so that the actuating fluid causes the piston to move the valve spool to the fluid blocking position.

6. The combination of claim 5 including a pedal operatively connected to the valve spool for manually positioning of the valve spool to its fluid blocking position against the biasing force of the resilient means.

7. The combination of claim 6 including second resilient means disposed between the piston and the valve spool for resiliently biasing the valve spool to the fluid blocking position when the pedal is depressed.

* * * * *